United States Patent Office 3,394,091
Patented July 23, 1968

3,394,091
FORMALDEHYDE - 2 - METHYL GLUTAROGUAN-AMINE REACTION PRODUCT AND MOLDING COMPOSITIONS PRODUCED THEREFROM
Edward L. Kropa, Columbus, and Gilbert M. Gynn, Hilliard, Ohio, assignors, by mesne assignments, to Plastics Manufacturing Company, Dallas, Tex., a corporation of Texas
No Drawing. Filed Apr. 12, 1965, Ser. No. 447,549
6 Claims. (Cl. 260—17.3)

ABSTRACT OF THE DISCLOSURE 2-methyl glutaroguanamine, and the product of its reaction with formaldehyde.

Background of the invention

The invention relates to a novel carbon compound of the aminotriazine type, specifically 2-methyl glutaroguanamine, and to improved products comprising synthetic resins prepared by reacting such compound with formaldehyde.

The synthetic resins of the present invention have certain important advantages over the synthetic resins which have been produced heretofore by reacting formaldehyde with aminotriazines such as melamine.

One of the more important commercial uses of synthetic resins of the melamine-formaldehyde type is the production of molded dinnerware such as cups, plates and saucers. Dinnerware molded from melamine-formaldehyde compositions has been produced in large quantities during recent years because of its superior durability. However, further expansion of the market for melamine-formaldehyde dinnerware has been seriously impeded by the fact that such dinnerware is subject to staining and loss of lustre during use. This deficiency of melamine-formaldehyde dinnerware has been a severe limitation upon the acceptance of such dinnerware, particularly for use in restaurants and institutions. In the use of such dinnerware in restaurants and institutions, each piece of dinnerware is used more frequently than in household use so that staining and loss of lustre are accelerated. This deficiency has limited the use of melamine-formaldehyde dinnerware in restaurants and institutions, although such dinnerware otherwise is ideally suited for used in restaurants and institutions because of its durability.

United States Patent No. 2,579,985, issued Dec. 25, 1951, disclosed a modified molding composition of the melamine-formaldehyde type. The modification which was disclosed in that patent consisted in the use of benzoguanamine in place of some of the melamine employed in preparing the molding composition, so that the molding composition disclosed in that patent contained reaction products of formaldehyde with both melamine and benzoguanamine, instead of reaction products of formaldehyde with melamine alone. Patent No. 2,579,985 disclosed that articles molded from a melamine-benzoguanamine-formaldehyde molding composition had approximately three times the stain resistance and thus approximately three times the useful life of articles molded from standard melamine-formaldehyde molding compositions. However, articles molded from a melamine-benzoguanamine-formaldehyde molding composition are subject to severe yellowing upon exposure to light.

Little success has been encountered heretofore in searching for another guanamine which could be used in combination with melamine for reaction with formaldehyde to produce improved molding compositions. Among the guanamines that are readily available, many are found to produce no improvement when substituted for part of the melamine used in preparing a melamine-formaldehyde molding composition. Other guanamines have various disadvantages. For example, adipoguanamine has the disadvantage that its reaction products with formaldehyde are quite insoluble.

Summary of the invention

The principal object of the invention is to provide a novel guanamine whose reaction products with formaldehyde can be used to produce articles of improved properties. More specific objects and advantages are apparent from the following description, which discloses and illustrates but is not intended to limit the invention.

In accordance with the present invention, a novel guanamine (2-methyl glutaroguanamine, hereinafter called isoadipoguanamine) has been prepared, and it has been discovered that valuable articles of improved properties can be produced from the reaction products of this quanamine and formaldehyde.

Isoadipoguanamine has been found to be superior to benzoguanamine in that articles containing reaction products of isoadipoguanamine and formaldehyde are not subject to yellowing upon exposure to light. Also, isoadipoguanamine is much more useful than adipoguanamine in that the reaction products of isoadipoguanamine and formaldehyde have adequate solubility in water.

The reason for the much greater solubility of the reaction products of isoadipoguanamine and formaldehyde is not known, but a possible explanation is that isoadipoguanamine exists as a mixture of two stereoisomers because the carbon atom to which the methyl group is attached is asymmetric. Adipoguanamine has no such asymmetric carbon atom and therefore exists only as a single entity.

Although isoadipoguanamine is free from the disadvantages of benzoguanamine and adipoguanamine, it has been found that isoadipoguanamine acts like benzoguanamine to reduce stain resistance when substituted for part or all of the melamine used in preparing a melamine-formaldehyde molding composition. Also, isoadipoguanamine is a diguanamine, and is more reactive with formaldehyde than benzoguanamine which is a monoguanamine.

Description of the preferred embodiments

When isoadipoguanamine is used alone for reaction with formaldehyde, the molar ratio of formaldehyde to isoadipoguanamine preferably is of the order of 3:1 to 4:1.

Excellent results can be obtained by the use of equal moles of melamine and isoadipoguanamine. Thus for reasons of economy, the molar ratio of isoadipoguanamine to melamine preferably is not greater than about 1:1. Preferably the molar ratio is at least 1:10. When a mixture of melamine and isoadipoguanamine is used for reaction with formaldehyde, the ratio of the moles of formaldehyde to total moles of melamine and isoadipoguanamine may range from about 1.3:1 to about 3:1.

The good results which are obtained by the use of a mixture of approximately equal moles of isoadipoguanamine and melamine for reaction with formaldehyde are believed to be due to the combined effect of the beneficial influence of the isoadipoguanamine and the beneficial influence of the lower proportion of formaldehyde which is made possible by the use of melamine in combination with the isoadipoguanamine.

The superiority of the synthetic resins of the present invention as compared to ordinary melamine-formaldehyde resins is believed to be due to the more hydrophobic or water-resistant nature of the present synthetic resins. Accordingly, the synthetic resins of the present invention are universally applicable as substitutes for ordinary melamine-formaldehyde resins, and make possible production of improved products which have superior water resistance and which have various other advantages which are attributable to their superior water resistance. Compositions of the present invention, comprising a product of the reaction of formaldehyde either with isoadipoguanamine or with a mixture of melamine and isoadipoguanamine, may be used in place of melamine-formaldehyde reaction products to produce molding compositions, adhesives, impregnating resins or laminating resins, or may be reacted with alcohols such as butanol to produce coating resins in each case using the procedure conventionally employed with melamine-formaldehyde reaction products.

Preparation of isoadipoguanamine

The starting material for the preparation of isoadipoguanamine is 2-methyl glutaronitrile (1,3-dicyanobutane), the preparation of which is described in U.S. Patent No. 2,405,948. 2-methyl glutaronitrile also may be prepared from methylene glutaronitrile, which is a dimer of acrylonitrile, by hydrogenation at pressures up to 1000 pounds per square inch in the presence of a palladium-on-carbon catalyst.

Isoadipoguanamine may be prepared by reaction of 2-methyl glutaronitrile with dicyandiamide in a hydroxylated solvent such as ethylene glycol or ethylene glycol monomethyl ether or in liquid ammonia under pressure (preferably in admixture with methanol), in the presence of a strongly basic catalyst such as potassium hydroxide, sodium hydroxide or metallic sodium.

Reaction with formaldehyde

In the practice of the present invention, isoadipoguanamine either alone or in admixture with melamine may be reacted with formaldehyde by the procedures conventionally used for reacting melamine and formaldehyde. Ordinarily the first step consists in dissolving the isoadipoguanamine in a commercial aqueous formaldehyde solution containing 37 percent by weight of formaldehyde. The pH of the formaldehyde solution should be adjusted in advance, for example by the addition of a base such as sodium hydroxide, so that the pH of the initial clear reaction solution is between 6 and 9, preferably about 8. The reaction may be carried out by refluxing until a stable solution is obtained.

Often it is desirable to add water at the start of the reaction in order to produce a solution of the desired concentration.

A stable aqueous solution thus prepared may be utilized in the same manner as a solution of a melamine-formaldehyde reaction product. For example, the solution may be used to impregnate a filler, such as bleached sulfite pulp, and drying may be carried out at about 200–240° F. for 40–60 minutes, to produce a molding composition containing 25 to 35 percent by weight of the filler. The dried product may be mixed with the usual additives and ground to a fine powder in a ball mill or hammer mill. The additives may include pigments, lubricants such as zinc stearate, and acidic materials such as phthalic anhydride to promote cure in the mold.

If a darker color is not objectionable, wood flour may be used as the filler. Other cellulosic fillers which may be employed include ground wood pulp, cotton linters and regenerated cellulose fiber.

Example 1

A 2-liter 3-neck flask equipped with a reflux condenser, stirrer and thermometer is charged with a solution of 0.2 mole of potassium hydroxide in 600 ml. of ethylene glycol monomethyl ether. After the addition of 108 grams (1 mole) of 2-methyl glutaronitrile and 185 grams (2.2 moles) of dicyandiamide, the mixture is refluxed with stirring for about 5 hours. The reaction mixture is allowed to cool to room temperature, and then is diluted with about 1 liter of water and is neutralized with acetic acid. The solids are collected by filtration, washed several times with water at room temperature, once with hot water and once with alcohol, and then dried. The yield of isoadipoguanamine is from 70 to 85 percent of theoretical. Kjeldahl analysis shows the product to contain 49 to 50.1 percent of nitrogen, as compared with a calculated nitrogen content of 50.7 percent. The melting point as determined by differential thermal analysis is 238° C.

Example 2

A 500-ml. 3-neck flask equipped with a reflux condenser, stirer and thermometer was charged with a 37 percent aqueous formaldehyde solution and an additional quantity of water. After the solution had been warmed to about 49° C., isoadipognuanamine and melamine were added. The solution, which had an initial pH of about 8, was refluxed with stirring until cloudiness developed when 2 or 3 drops of the solution were added to 50 ml. of water at 37.8° C. The period of refluxing was from 10 to 30 minutes. A stable solution was obtained on cooling to room temperature. The additional amount of water used at the beginning of the reaction was an amount such that the solids content of the final solution was 50 percent. In calculating the solids content of the final solution it was assumed that one mole of water was split off during the reaction for every 3 moles of formaldehyde.

The solution thus prepared, after the addition of a sufficient amount of lactic acid to bring the pH of the solution between 6 and 7, was used to impregnate a sheet of paper of the type which is employed commercially as a surface lamination in the molding of dinnerware from melamine-formaldehyde molding compositions. The impregnated paper was then dried for about 90 seconds at about 250° F. The dried product, which contained from about 65 to about 70 percent by weight of the reaction product, was used as a surface lamination in the molding of a plate from a commercial alpha cellulose-filled melamine-formaldehyde molding composition. A preheated preform of the molding composition was first molded at a temperature of 315° F. and under a pressure of about 3000 pounds per square inch for 45 seconds, and the mold then was opened and the impregnated paper placed on top of the molded piece. The mold then was closed to hold the piece under the same pressure and temperature for 120 seconds, and the finished piece was then ejected from the mold. The molded plate thus produced was tested by immersing it for 65 hours in a test bath which was prepared by adding instant coffee to water in an amount equal to one teaspoon of coffee per cup of water. The bath was maintained during the test at a temperature between 90 and 100° C.

After removal from the test bath, the plate was washed with soap and water and dried, and the final color of the plate was compared with its initial color to determine the amount of darkening which had occurred during immersion in the coffee solution. The color of the plate was measured before and after immersion on the Rd scale of a Gardner color difference meter, which represents white by 100 Rd units and black by zero Rd units.

The following table shows the results of several tests that were conducted in accordance with the foregoing procedure, and shows the number of moles of each reactant, the mole percent of isoadipoguanamine as compared with the total moles of melamine and isoadipoguanamine, and the change in color during immersion in the test bath, expressed as the reduction in the number of Rd units.

| Formaldehyde moles | Melamine, moles | Isoadipoguanamine moles | Isoadipo, mole percent | Change in color |
|---|---|---|---|---|
| 1.4 | 1 | 0 | 0 | −55.5 |
| 1.4 | 0.7 | 0.15 | 17.6 | −43.3 |
| 1.4 | 0.4 | 0.3 | 43 | −28.5 |
| 1.4 | 0.3 | 0.35 | 53.8 | −21.2 |
| 2.0 |  | 0.5 | 100 | −20.0 |

The above table shows that stain resistance was substantially improved by using isoadipoguanamine to replace part of the melamine employed for reaction with formaldehyde, and also shows that the amount of improvement increased as the proportion of isoadipoguanamine was increased. The relatively slight amount of improvement which was obtained by replacing all of the melamine with isoadipoguanamine was believed to be due to the effect of the greater proportion of formaldehyde which had to be employed in order to obtain a water soluble reaction product when no melamine was present.

The appearance of all the laminated surfaces produced by the use of isoadipoguanamine was substantially identical to the appearance of the laminated surface produced by the use of melamine alone for reaction with formaldehyde. The color stability upon exposure to ultraviolet light and the resistance to scratching of a diamond point, determined by the Taber scratch-hardness test, also were found to be identical to that of the laminated surface produced by the use of melamine alone for reaction with formaldehyde.

When an attempt was made to use adipoguanamine rather than isoadipoguanamine in combination with melamine to prepare an aqueous reaction solution by the same procedure, it was found that a water soluble reaction product could not be obtained when the molar amount of adipoguanamine used was more than about 15 percent of the total moles of melamine and adipoguanamine.

We claim:

1. A reaction product of formaldehyde and 2-methyl glutaroguanamine in a molar ratio which is of the order of 3:1 to 4:1.

2. A reaction product of formaldehyde with 2-methyl glutaroguanamine and melamine in a ratio such that the moles of formaldehyde are from 1.3 to 3 times the total moles of melamine and 2-methyl glutaroguanamine.

3. A thermosetting molding composition comprising a cellulose filler and a reaction product of formaldehyde and 2-methyl glutaroguanamine in a molar ratio which is of the order of 3:1 to 4:1.

4. A thermosetting molding composition comprising a cellulose filler and a reaction product of formaldehyde with 2-methyl glutaroguanamine and melamine in a ratio such that the moles of formaldehyde are from 1.3 to 3 times the total moles of melamine and 2-methyl glutaroguanamine.

5. A cured article of improved stain resistance comprising cellulose and a thermoset reaction product of formaldehyde and 2-methyl glutaroguanamine in a molar ratio which is of the order of 3:1 to 4:1.

6. A cured article of improved stain resistance comprising cellulose and a thermoset reaction product of formaldehyde with 2-methyl glutaroguanamine and melamine in a ratio such that the moles of formaldehyde are from 1.3 to 3 times the total moles of melamine and 2-methyl glutaroguanamine.

References Cited

UNITED STATES PATENTS

| | | | |
|---|---|---|---|
| 2,423,353 | 7/1947 | Thurston | 260—67.6 |
| 2,461,336 | 2/1949 | Mikeska | 260—537 |
| 3,090,807 | 5/1963 | Illing et al. | 260—537 |

WILLIAM H. SHORT, *Primary Examiner.*

E. M. WOODBERRY, *Assistant Examiner.*